Dec. 1, 1931.   G. CURRIE   1,834,385
ELEVATOR GUIDE
Filed May 27, 1929   2 Sheets-Sheet 1

INVENTOR
Gilbert Currie
BY
[signature]
ATTORNEY

Dec. 1, 1931.  G. CURRIE  1,834,385
ELEVATOR GUIDE
Filed May 27, 1929  2 Sheets-Sheet 2
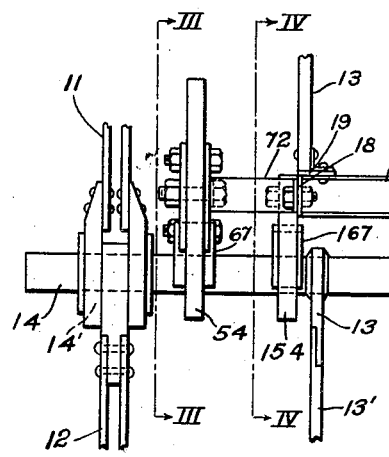
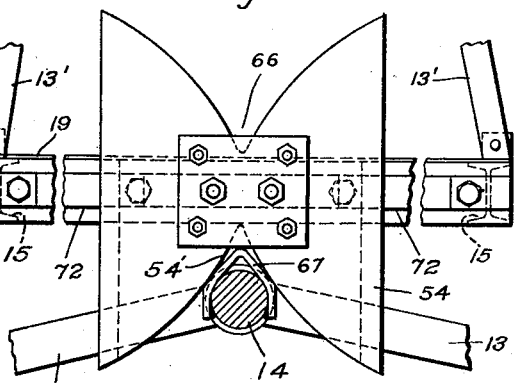
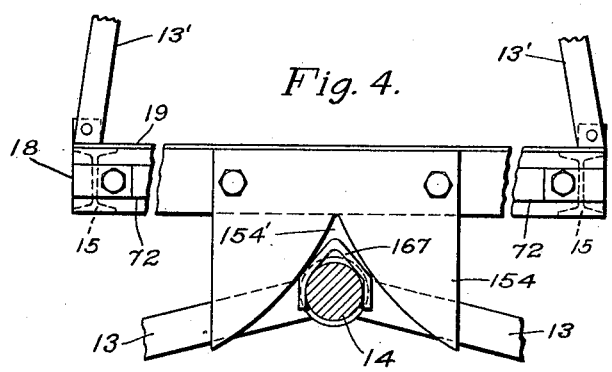
INVENTOR
Gilbert Currie.
BY
ATTORNEY Patented Dec. 1, 1931

1,834,385

UNITED STATES PATENT OFFICE

GILBERT CURRIE, OF WILKINSBURG, PENNSYLVANIA, ASSIGNOR TO WESTINGHOUSE ELECTRIC & MANUFACTURING COMPANY, A CORPORATION OF PENNSYLVANIA

ELEVATOR GUIDE

Application filed May 27, 1929. Serial No. 366,289.

My invention relates to storage devices and particularly to storage systems including movable conveyors, such as elevators.

My improvement is a means for obviating the use of guide rails for cages during their vertical movements by interlocking the cages through the vertical columns.

In order to solve the problem of automobile parking in large cities, especially in congested areas in which facilities for parking are limited, it has been proposed to utilize vertical storage systems in order that a large number of automobiles may be stored upon small ground areas. Certain of the systems proposed include a storage structure comprising, in effect, a series of load movers, receptacles, automobile-carrying platforms, or cages moving in a continuous path through a pair of adjacent columns interconnected at their ends. In order to receive and store the automobiles for which the system is to be utilized, suitable power mechanism is provided to simultaneously move the cages or receptacles in one column upwardly and the cages in the adjacent column downwardly and to transfer the uppermost cage from the top of first column to the top of the second column and transfer the bottommost cage in the second column from the bottom of the second column to the bottom of the first column. In other words, the power mechanism moves the entire system of cages in a circuitous path past any selected level which is to be utilized as the loading and unloading point for the system.

In order to obtain a maximum per cent utilization of the total volume of building space available for storage, it has been proposed to use a system of elevators of this type, which includes a mechanism for moving the uppermost cage in one column to the top of the adjacent column at a speed greater than the speed of the cages moving in the vertical columns, in order to obviate the necessity of spacing the cages along the chain at a greater distance than is actually required to accommodate the height of an automobile.

In the pending application of H. D. James, Serial No. 330,455, filed January 5, 1929 and assigned to the Westinghouse Electric & Manufacturing Company, is shown and described a conveyor-type elevator embodying a rapid transfer means comprising, briefly, two rigid arms, one end of each being fastened by a suitable means and with a certain distance between them, to the endless chain, the other ends being fitted together to form a supporting joint or bearing for a cage or receptacle-suspending beam or rod. The two parallel endless chains are similarly equipped, and the individual cage is suspended from a cage-supporting beam or rod extending between two of the supporting joints or bearings. Essentially, the rapid-transfer means might be described as a triangular member, one side of which coincides with the line of movement of the endless chain and the apex opposite to this side acting as a point of support for one side of a cage. The operation of the rapid-transfer means, that is, how it operates to secure a rapid movement of the cages as they move around a sprocket wheel from one line of movement to another, will be described in detail later.

In order to allow the use of the projecting arms for supporting cages at a distance from the line of movement of the endless chain, it was found necessary to provide the endless chain with rollers or wheels rotatably fastened on each side of the chain, the chain being thus designed to move, without friction, through a guide surrounding it, the said guide comprising essentially two channel irons so placed as to form a hollow square. That is, the eccentric loading of the endless chain, caused by the cages being supported at the end of the projecting arms, would cause a lateral displacement of the chain from the line of movement it should follow unless these channel guides surrounding the chain were used.

However, this means of increasing the speed of transfer was found to present an additional problem because of the swinging of the cage brought about by its inertia effect when its speed is changed at the point of transfer. In order to prevent this swinging of the cage, which was not only objectionable but dangerous, it was proposed to use a guiding means which would hold the cage in a substantially vertical position, as it moved around the sprocket wheel or sheave in transferring from one vertical shaft to another.

One of the guiding arrangements proposed was to allow projecting pins or rotating wheels on each side of a cage to engage a fixed groove similar in shape to the path of travel of the cage while the cage was moving around the sprocket wheel.

Another arrangement comprised, essentially, a sprocket wheel rotating in synchronism with the movement of the cages in the elevator system whereby fingers on the sprocket wheel would engage projecting lugs on the individual cages and thus positively drive the bottom of each cage in synchronism with the top resulting in a substantially vertical position of the cages being maintained during the time of transfer from one vertical shaft to another.

Still another proposed guiding arrangement for cages during this time of transfer comprises the combination of a fixed stationary guide (similar to the one heretofore described) and a cage-engaging sprocket wheel driven synchronously with the movement of cages, whereby the guided portion of the cages is moved positively through the guideway by the action of the synchronously-driven sprocket wheel.

Despite the guideway channel irons through which the endless chains move, it will be obvious that the individual cages will not be entirely guided in a fixed path during vertical travel by their use alone. That is, although the points of support of the cages are fixed relative to their endless chains and, although the endless chains are definitely fixed in their paths by the channel-iron guide surrounding them, yet the bottoms of the cages can move laterally, both with respect to an adjacent cage and with respect to the structure defining the columns, especially when a cage is unsymmetrically loaded.

This lateral swinging or displacement of the cages is not to be confused with the lateral swinging of the cages which would occur if the guiding means heretofore described for maintaining the cages in a substantially vertical position during the time of transferring from one vertical shaft to another were not used.

It was found, by actual experience in a typical conveyor elevator of this type, that, even though the cages were guided around the sprocket wheels during the time of transfer from one shaft to another, so much vibration remained in the individual cages that, as they left the guiding device at the sprocket wheel, they started to swing laterally, even when symmetrically loaded, and some means was necessary to prevent them from swinging to such an extent as to strike the superstructure defining the shafts.

One solution of this problem of lateral movement of the cages would be to employ guide rails, such as are commonly utilized now in which the elevator cages move in a fixed path defined by guide rails, usually one on each side of the cage. However, these guide rails are objectionable from the standpoint of added cost to the system and upkeep and maintenance.

I have solved the problem of lateral swinging of the cages by using a device to automatically interlock the top and the bottom of successive cages during the vertical travel of the cages through the shafts or columns.

In a system using channel-iron guideways to define the path of the cage-supporting-and-moving-chain, the use of a cage-interlocking device, such as I propose to use, will obviously fix the path of the cages, thus performing the same function as guide rails and obviating the use of such rails for the cages.

My improvement, shown in detail in the accompanying drawings, Figs. 2, 3 and 4, comprises elements 67, 54, 167, and 154 of Fig. 1, and will subsequently be described. It is adaptable to conveyor-type elevator systems, such as is shown and described in the pending application of H. D. James, Serial No. 330,455 and assigned to the Westinghouse Electric & Manufacturing Company.

Moreover, it may be applied to any conveyor system to obviate cage and receptacle guide rails, regardless of the field of application.

Fig. 2 is an elevational view of a portion of the structure shown in Fig. 1, embodying details of my cage-interlocking device.

Fig. 3 is a cross sectional view, slightly enlarged, taken on line III—III of Fig. 2, and Fig. 4 is a cross sectional view, slightly enlarged, taken on line IV—IV of Fig. 2.

Figure 1:
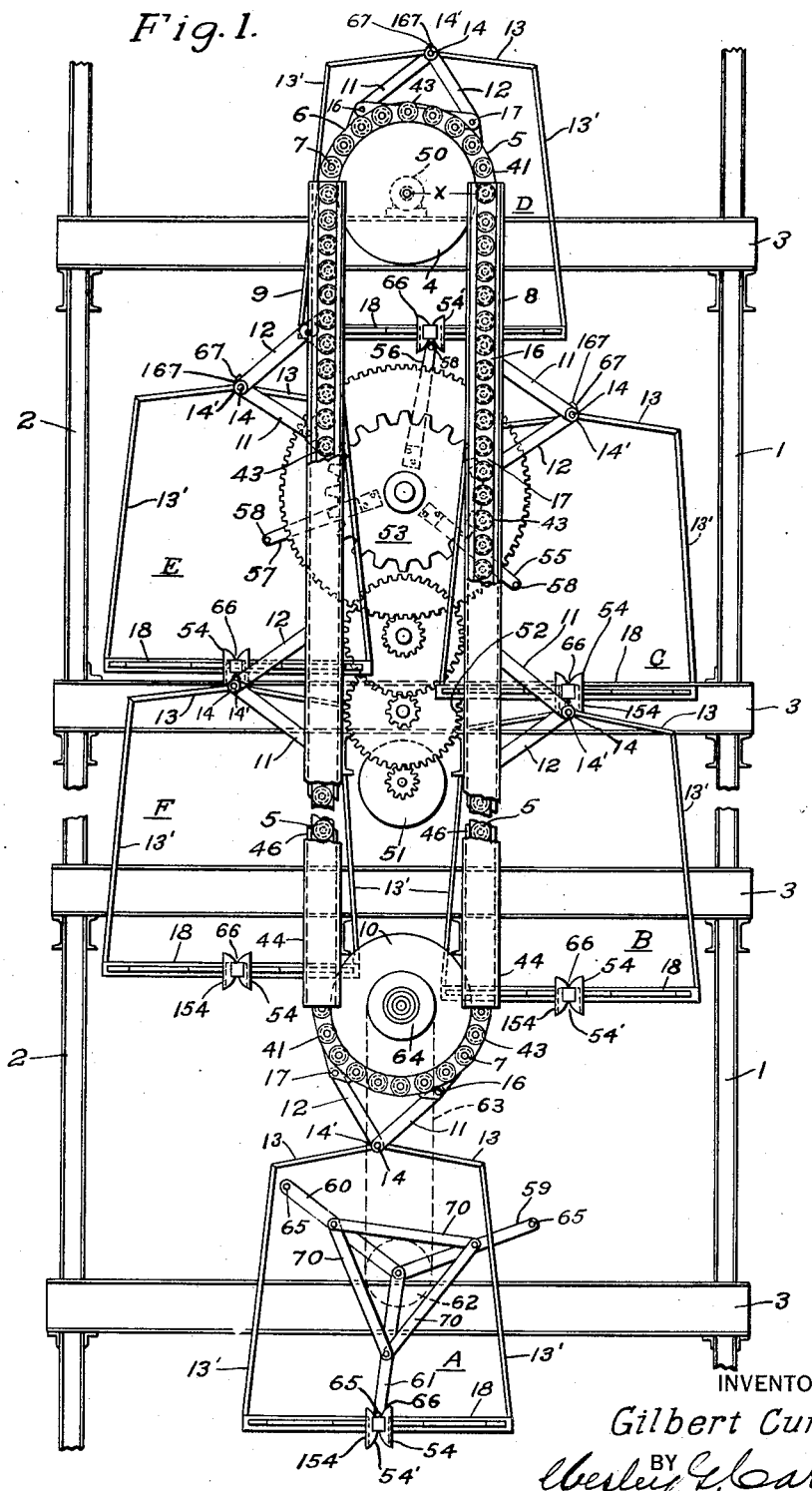
Fig. 1 is a side elevational view of a conveyor-type elevator, with a guide for the cage as it moves around the sprocket wheel in transferring between shafts, as well as a device for interlocking successive cages during their vertical travel adapted thereto.

Referring to Fig. 1, I have illustrated, a storage system of the endless-chain-conveyor type to be utilized for storing automobiles which consists of a suitable structural-steel supporting structure illustrated as comprising vertical columns 1 and 2, suitably braced by means of cross beams 3, upon the uppermost of which is mounted a chain-supporting sprocket 4, over which passes a suitable chain 5, constructed of a plurality of chain links 6, interconnected by means of pins 7. The chain 5 extends over the sprocket 4 and thence downwardly, within suitable guiding channels 8 and 9, to the lowermost portion of the supporting structure, whence it passes around a lower sprocket 10 and thence upwardly to sprocket 4. It will be observed that the chain 5, constructed as illustrated, constitutes an endless carrier upon which may be suspended a plurality of load receptacles or storage cases, six of which are illustrated and designated by the reference characters A, B, C, D, E and F. It will be readily understood that, while I have shown but one endless chain and associated structure for supporting the cages, this is for one side of the cages only. The opposite side is similarly supported by an endless chain and it operates simultaneously and in the same manner as explained for this one side.

Each of the load receptacles or cages is attached to the chain by means of a pair of attaching arms 11 and 12, pivotally secured to the top of the associated cage by means of a pivot-connection 14', between the supporting beam or rod 14 and members 11 and 12, whence the arms extend in a plane at right angles to the plane of movement of the chain 5 but having an angular relation to each other, to engage the chain 5 at points 16 and 17 that are spaced from each other on the chain.

Arms 11 and 12 are shown and described in detail in the above mentioned pending application of H. D. James, Serial No. 330,455.

On each side of the chain 5, is mounted a channel member 44, preferably constructed of a structural-steel channel, of the usual type. Secured within each of the channel members are a pair of tracks 46, suitably secured to the channel 44 by means of bolts to constitute a double track to engage outer surfaces of the rollers 43, which are rotatably fixed to both sides of the chain 5. The track members are preferably constructed of vibrationless material, such as wood or fibre, for the purpose of reducing the noise occasioned by the rollers 43 riding thereon in the normal movements of the chain 5 and the cages A, B, C, etc. The described construction of rollers and guides acts as a bracing means for withstanding side thrusts occasioned by the load in both horizontal and vertical planes.

In Fig. 2 is shown a detail of the construction of the top and the bottom of adjacent cages, the method of support of the cages, and the device comprising my invention. The bottom frame work of each cage or load receptacle comprises two I-beams 15 held together by transverse members 18 welded to their respective ends. Transverse plate members 19 are welded to the top flanged surfaces of the I-beams 15 to form the floor of each cage. Bolted, riveted, or welded to these transverse members 19 are supporting straps 13' which extend to the top members 13 which, in turn, are welded or suitably fastened, by some other means, to the supporting beam or rod 14. The supporting rod 14 is supported in the joint formed by the end members of arms 11 and 12 fastened to the endless chain 5 itself. Welded or bolted to the end member 18 is a bracket 72 which supports the guiding member or cam shoe 54, which is bolted thereto. The shape of this guiding member is clearly shown in Fig. 3.

Bolted directly to the end member 18 of each cage is a guiding member or cam shoe 154, the shape of which is shown in Fig. 4. It will be noted that cam shoe 154 is similar to the lower portion of cam shoe 54.

Attached to the supporting beam or rod 14, by a suitable means, is a lug 67 the top of which is substantially triangular in shape, as shown in Fig. 3.

Also fastened to the supporting rod or beam 14, by suitable means, is a similar lug 167 which has the same shape as lug 67. (See Fig. 4).

Referring again to Fig. 1, it will be observed that the arms 11 and 12 and the vertically extending portion of the chain 5, constitute a triangle having its base along the axis of the chain 5. This triangle is so constructed that its altitude is greater than the pitch radius X of the sheave or sprocket wheel 4. It will be observed, therefore, that movement of the cages through the vertical portion of the path defined by the chain 5 will be at a speed proportional to the pitch radius X of the sheave or sprocket 4, and that, when the triangular attaching device 11, 12 passes around the sheave or sprocket 4, the cage-supporting beam or rod 14 will move at a speed proportional to the radius of the arc of a circle which the rod 14 describes in its travel. I have shown the radius of the arc traveled by the rod 14 to be twice that of the pitch radius X of sheave 4, but it should be understood that I have merely adopted this ratio as preferable, any other ratio desired being dependent upon the speed of transfer required.

Each cage is transferred through a horizontal movement from the top of the one column to the top of the adjacent column at a varying rate of speed. Assuming a counter-clockwise direction of movement of the cage, this variation starts when the joint 16 between the endless chain 5 and the arm 11 passes the horizontal level of the bearing 50 of the sprocket wheel 4. The actual linear speed of the cage is gradually increased until the joint 17 between the endless chain 5 and the arm 12 reaches the level of the bearing 50 of the sprocket wheel 4. At this point, the cage is travelling at a maximum rate of speed, and this speed is proportional to the linear speed of the endless chain (which is the same as the vertical speed of the cages) in the same ratio, as explained before, as the distance from the center of the bearing 50 of the sprocket wheel 4 to the center of the supporting beam or rod 14 of the cage is to the pitch radius of the sprocket wheel 4. This maximum rate of speed is maintained by the supporting rod 14 and, necessarily, the cage suspended therefrom until the joint 16 between the endless chain 5 and the arm 11 reaches the horizontal level of the center of the bearing 50 at a point diametrically opposite the point with which it coincided when it first started to pass around the sprocket wheel 4. From this point, in the travel of the cage around the sprocket wheel 4, the speed of the supporting rod 14 and the cage suspended therefrom gradually decreases until the joint 17 between the endless chain 5 and the arm 12 coincides with the horizontal level of the center of the bearing 50 of the sprocket wheel 4. From this last position, the cage again travels vertically, but this time downwardly, at the normal rate of speed, which is the same as the linear speed of the endless chain.

It will be readily understood that, during the time in which the horizontal component of the actual speed of the cage is increasing from zero to a maximum and back to zero again, the vertical component of the actual speed of the cage is decreasing from normal speed of travel to zero and back to normal again but in the opposite direction from that previously described. Obviously, the horizontal component of the actual speed of the cage will have its maximum value at the point at which the center of the supporting rod 14 of the cage coincides with a vertical line through the center of the bearing 50 of the sprocket wheel 4; for, in this position, the horizontal component of the actual speed of travel of the cage is identical with the actual speed of travel of the cage. At this point, also, it must follow that the vertical component of the actual speed of each cage is zero.

It will be observed that a similar action will take place at the lowermost portion of the structure when the rod 14 for any cage passes through the arc of the circle around the lower sheave or sprocket 10. Hence, the mechanism just described constitutes a means for rapidly transferring the cages from one vertical column to the other. By constructing the cages and their attaching devices in accordance with the description set forth, it will be observed that, through the vertical portions of the movements of the cages, they may be secured upon the chain in close relation, there being substantially no waste space between the top member 13 of the one cage and the lower members 15 of the cage mounted just above it. Hence, by the elimination of this waste space, a greater number of automobiles may be stored within a given vertical height of storage structure or housing.

The particular means for applying motive power to the chain 5 is not material to my invention. I have shown a driving mechanism similar to that illustrated in the co-pending application of H. D. James, Serial No. 265,011, filed March 27, 1928 and assigned to the Westinghouse Electric and Manufacturing Company, which comprises a suitable motor 51, driving through suitable reduction gearing 52, a sprocket 53, the teeth of which engage the roller bushings 41 of the chain to thereby drive the chain upwardly upon one side of the sprocket 53 and downwardly upon its opposite side. However, any other suitable driving mechanism might be employed.

It will be observed that, due to the accelerated horizontal motion of the cages, as they move from one column to the other, the inertia of the cages opposes the change from zero to maximum speed of horizontal movement and will cause the cages to swing upon their pivot connections 14' and, as will be the case when these cages are loaded with such weights as are present in the contemplated use of this device, such as an automobile-storage structure, such swinging movement is undesirable, if not extremely dangerous. For this reason, a mechanism is employed for guiding the lowermost part of each cage during that portion of its movement which consists of the transfer of the cage from one column to the next. This guiding mechanism comprises the cam shoe 54 secured to the end plate 18 of the lowermost portion of the frame-work of each of the cages A, B, C, etc. by a suitable bracket 72 (see Fig. 2). Cam shoe 54 is engageable by any one of the three arms 55, 56, and 57 rotatable with the driving sprocket 53. The outer end of each of the arms 55, 56, 57 is provided with a suitable pin 58 for engagement with a depression 54' in the bottom of each of the cam shoes 54. (Fig. 3.)

It will be observed, from an inspection of Fig. 1, that the radius of the sprocket 53 is the same as the radius of the sheave 4, while the arms 55, 56 and 57 are each constructed of such length that the pins 58 lie at a distance from the axis of rotation of the gear 53, equal to twice the radius of the sprocket. Hence, the pin 58 on any one of the arms 55, 56, 57 will move in synchronism with the cage-supporting rod 14 and the top of the cage, as the rod 14 moves over the curved path concentric with the sheave 4. By suitably arranging the location of each of the arms 55, 56 and 57, with respect to the location of the attaching arms 11 and 12, and with reference to the chain 5, it follows that, as the rod 14 starts through its curved path over the sheave 4, one of the pins 58 on the arms 55, 56, 57 will engage the cam shoe at the lower portion of the corresponding cage. Hence, the lower end of the cage will be guided in exact synchronism with the movements of the upper end of the cage during the transfer period.

In a similar manner, a plurality of arms 59, 60, 61, held in definite relative position by the supporting members 70, are mounted upon a suitable sprocket 62, which is driven by means of any suitable connection, such as a chain 63, from any moving part of the chain 5 or its driving mechanism (illustrated herein as comprising a sprocket 64 rotatable with the lower chain sheave or sprocket 10). The arms 59, 60, and 61 may be moved through a curved path corresponding to the arcuate movement of the rods 14 as the cages pass from one vertical column to the other at the lowermost portion of their travel. Each of the arms 59, 60, 61 is provided with a pin 65 corresponding to the pins 58 described with reference to arms 55, 56, 57, for the purpose of engaging a depression 66 (see Fig. 3) in the top of cam shoes 54 to thereby guide the cages through the transfer movement at the lower portion of the storage structure.

After the completion of the rapid-transfer movement at either the upper or the lower sprocket wheels, it will be obvious that the tops and bottoms of successive cages again assume their normal, closely-spaced relation. Also, it may clearly be seen that, as they assume their normal closely spaced relation for travel in the vertical paths of movement, automatically, lug 67 and lug 167 on the top of each cage engage the guiding members 54 and 154, respectively, which are mounted on the bottom of the adjacent cage.

These guiding members 54 and 154, as well as the lugs 67 and 167, are preferably mounted on both sides of each cage, although they need not necessarily be so mounted. That is, they may be mounted on one side alone. In either case, the result is essentially the same, although, with guiding members and lugs on both sides of each cage, a more rigid interlocking is secured.

These guiding members 54 and 154, as well as the lugs 67 and 167, may be made of wood or of some fibrous material or of some phenolic condensation product so that the noise attendant upon their cooperation is a minimum.

I do not mean to limit my invention to the particular construction of lugs, as I have shown them, for other forms of construction can easily be used which will perform the same functions and operate likewise with a minimum amount of noise.

It will readily be seen that, with the kind of support for the cages or load receptacles hereinbefore described, comprising channel guides for the endless chains and an interlocking mechanism for successive cages, guiding rails for the maintaining of a fixed vertical path for the cages need not be employed.

The fixation of the point of support for each cage is, of course, due to the fact that the supporting endless chain is maintained in a fixed vertical linear path by the guide rails surrounding the chain. The fixation of the top of one cage obviously determines the fixation of the bottom or lower portion of the adjacent cage, because the interlocking device, which constitutes my invention, holds the top of one cage and the bottom of the adjacent cage in a fixed position relative to each other.

Thus, it may be seen that, since both the top and the bottom of each cage are maintained in a fixed vertical path of travel, the vertical path of each cage or receptacle is fixed, and special guide rails to maintain each cage in a fixed vertical path are not essential, although they may be employed.

It will be noted that I have shown the cam shoe 54 as serving in several capacities. That is, I have shown it as an engaging means for lug 67, whereby successive cages are interlocked, and I have also shown it as an engaging means for pins 58 and 65 which engage it during the period of cage transfer from the one vertical column to the other, whereby the cages are guided in a substantially vertical position during that time.

It will be clearly evident that, when guiding member 154 on one cage is engaged by the lug 167 on the adjacent cage, it performs the same function as the lower portion of cam shoe 54. That is, it interlocks the top and the bottom of adjacent cages.

I have shown and described guiding means 154 and lug 167 because their employment in connection with guiding member 54 and lug 67 insures a firm, rigid interlocking of adjacent cages.

However, the utilization of the guiding member 154 and the lug 167 is not absolutely essential, as practically the same result may be secured by employing guiding member 54 and lug 67 alone.

It should be understood that I do not claim the method of guiding cages in a substantially vertical position during the transfer period from one vertical column to another by the use of rotating members which engage the individual cages.

However, I do claim a guiding device of novel construction and dual function such as I have described. I do claim a method of interlocking adjacent cages to prevent their lateral movement or swinging during vertical movement, whereby the use of extra guide rails for the cages is obviated.

The advantages of my invention and its novel construction are clearly apparent from the fact that the cages or load receptacles are guided throughout the entire circuitous path with a smooth and practically noiseless guiding action.

From the above description, it will be apparent that I have shown a conveyor-type elevator system which allows close spacing of successive cages (this being made possible by the use of a device which increases the speed of the cages as they travel from the one vertical column to the other around the sprocket wheel sheaves), which maintains the cages in a substantially vertical position during the transfer period between columns, and which provides means for interlocking successive cages during their movement through vertical paths, thus obviating the use of special guide-rail equipment for the cages and appreciably reducing the total cost of installation of an elevator system.

It is to be understood that the foregoing embodiments of my invention have been described in terms intended to be illustrative only, and that I do not desire to be limited to any of the details shown and described herein, except as defined in the appended claims.

I claim as my invention:

1. In a conveyor system, the combination with a supporting structure and receptacles moving therein, of a guiding means on each receptacle and a means on each receptacle for engaging said guiding means on an adjacent receptacle, whereby relative lateral movement between successive receptacles is prevented.

2. In an elevator system, means defining adjacent vertical columns interconnected at their respective ends, a plurality of load receptacles in each of said columns, means for moving said load receptacles through said columns in a definite path and with a continuous movement, guiding means on each receptacle, means on each receptacle for so engaging the guiding means of the adjacent receptacle that successive receptacles are interlocked and relative movement between successive receptacles and between the receptacles and the said means defining adjacent vertical columns is prevented.

3. In an elevator system, means defining adjacent vertical columns interconnected at their respective ends, a plurality of load receptacles in each of said columns, means for moving said load receptacles through said columns in a definite path and with a continuous movement, guiding means cooperating with said moving means to maintain said moving means in a fixed path of movement, guiding means on each receptacle, means on each receptacle for engaging said last-mentioned guiding means on the adjacent receptacle, whereby successive receptacles are interlocked and relative movement between successive receptacles and between the receptacles and the said means defining adjacent vertical columns is prevented.

4. In an elevator system, means defining adjacent vertical columns interconnected at their respective ends, a plurality of load receptacles in each of said columns, means for moving said load receptacles through said columns in a definite path and with a continuous movement, means movable in a path corresponding to that described by said receptacles in transferring from one vertical column to another, guiding means on each receptacle, said guiding means being engageable by said last-mentioned movable means to maintain said receptacles in a substantially vertical position while transferring from the one vertical column to the other, means on each receptacle for engaging said guiding means of an adjacent receptacle, whereby lateral relative movement between successive receptacles and between the receptacles and said means defining adjacent vertical columns is prevented.

5. In an elevator system, means defining adjacent vertical columns, interconnected at eral relative movement between successive receptacles in each of said columns, means for moving said load receptacles through the said columns in a definite path and with a continuous movement, means movable in a path corresponding to the path described by said receptacles while transferring from one vertical column to another, guiding means on each receptacle, said guiding means being engageable by said last mentioned movable means, whereby said receptacles are maintained in a substantially vertical position while transferring from one vertical column to another, a second guiding means on each receptacle, a means on each receptacle for engaging said second guiding means on an adjacent receptacle, whereby lateral relative movement between successive receptacles and between the receptacles and the said means defining the adjacent vertical columns is prevented.

6. In an elevator system, means defining adjacent vertical columns interconnected at their respective ends, a plurality of load receptacles in each of said columns, means for moving said load receptacles through the said columns in a definite path and with a continuous movement, guiding means on each of said load receptacles, said guiding means being substantially a rectangular member with substantially triangular portions cut out on two opposite sides, means on each receptacle comprising an upstanding lug for engaging said guiding means of the adjacent receptacle in one of triangular portions, whereby lateral relative movement between successive receptacles and between the receptacles and said means defining adjacent vertical columns is prevented.

7. In an elevator system, means defining adjacent vertical columns interconnected at their respective ends, a plurality of load receptacles in each of said columns, means for moving said load receptacles through the said columns in a definite path and with a continuous movement, guiding means on each of said load receptacles, said guiding means being substantially a rectangular member with a substantially triangular portion cut out on one side, means on each of said load receptacles comprising an upstanding lug for engaging said guiding means of the adjacent load receptacle in the triangular cut-out portion, whereby lateral relative movement between successive load receptacles and between the receptacles and said means defining adjacent vertical columns is prevented.

8. In an elevator system, means defining adjacent vertical columns interconnected at their respective ends, a plurality of load receptacles in each of said columns, means for moving said load receptacles through the said columns in a definite path and with a continuous movement, guiding means on each receptacle, said guiding means being substantially a rectangular member with substantially triangular portions cut out on two opposite sides, means on each receptacle comprising an upstanding lug for engaging said guiding means of the next preceding receptacle in one of the triangular portions, whereby lateral relative movement between successive receptacles and between the receptacles and said means defining adjacent vertical columns is prevented, means movable in a path similar to that described by said receptacles in transferring from one vertical column to another and engaging said guiding means on each receptacle, whereby said load receptacles are maintained in a substantially vertical position while transferring from one vertical column to another.

9. In an elevator system, means defining adjacent vertical columns interconnected at their respective ends, a plurality of load receptacles in each of said columns, means for moving said load receptacles through the said columns in a definite path and with a continuous movement, means movable in a path corresponding to the path described by said load receptacles while transferring from one vertical column to another, guiding means on each load receptacle comprising a rectangular member with substantially triangular portions cut out on two opposite sides, said guiding means on each load receptacle being engageable by said last mentioned movable means, whereby said load receptacles are maintained in a substantially vertical position while transferring from one vertical shaft to another, a second guiding means on each load receptacle comprising a rectangular member having a triangular portion cut out on one side, means on each receptacle for engaging said second guiding means on each load receptacle in the triangular cut-out portion, whereby lateral relative movement between successive load receptacles and between the load receptacles and the said means defining the adjacent vertical columns is prevented.

10. In a conveyor comprising a plurality of load movers movable in an endless path, guiding means on each mover, and means on each mover for engaging said guiding means on an adjacent mover, whereby relative lateral movement between adjacent movers is prevented.

11. In a conveyor comprising a plurality of load receptacles movable in an endless path, guiding means on each receptacle, and means on each receptacle for engaging said guiding means on an adjacent receptacle, whereby relative lateral movement between adjacent receptacles is prevented.

12. In a conveyor comprising a plurality of load receptacles movable by continuous movement through an endless path, guiding means on each receptacle, and means on each receptacle for engaging said guiding means on an adjacent receptacle, whereby relative movement between adjacent receptacles is prevented.

13. In a conveyor having a plurality of receptacles movable in a circuitous path comprising two adjacent interconnected straight portions, guiding means on each receptacle, and means on each receptacle for engaging said guiding means of an adjacent receptacle, whereby relatively lateral movement between adjacent receptacles is prevented during their movement through the straight portions.

14. In a conveyor having a plurality of closely spaced receptacles movable in a circuitous path comprising two adjacent interconnected straight portions, guiding means on each receptacle, and means on each receptacle for engaging said guiding means of an adjacent receptacle, whereby relative lateral movement between adjacent receptacles is prevented during their movement through the straight portions.

15. In a conveyor, a plurality of load movers movable in a circuitous path successively through two adjacent interconnected straight portions thereof, guiding means on each mover, means engageable with said guiding means on each mover as the mover transfers from one straight portion to the other to maintain a substantially constant orientation of said mover, and means on each mover engageable with said guiding means of an adjacent mover to prevent relative movement of adjacent movers during the movement thereof through the straight portions.

16. In a conveyor, a plurality of load movers movable in a circuitous path successively through two adjacent interconnected straight portions, guiding means on each mover, means movable in correspondence with the movement of the load movers for engaging said guiding means on each mover as the mover transfers from one straight portion to the other to maintain a substantially constant orientation of said mover, and means on each mover engageable with said guiding means of an adjacent mover to prevent relative movement of adjacent movers during movement thereof through the straight portions.

17. In a conveyor comprising means defining adjacent straight paths of movement interconnected at their respective ends, a plurality of load receptacles in each of said straight paths, means for moving said load receptacles successively through said straight portions in a definite path and with a continuous movement, guiding means cooperating with said moving means to maintain said moving means in a fixed path of movement, guiding means on each receptacle, means on each receptacle for engaging said last-mentioned guiding means of an adjacent receptacle, whereby successive receptacles are interlocked and relative movement between successive receptacles and between the receptacles and the said means defining the adjacent straight paths of movement is prevented.

18. In an elevator, means defining adjacent vertical columns interconnected at their respective ends, a plurality of load receptacles in each of said columns, means for moving said load receptacles successively through said columns in a definite path and with a continuous movement, means movable in correspondence with the movement of the said load receptacles in a path corresponding to that described by said receptacles in transferring from one vertical column to another, guiding means on each receptacle, said guiding means being engageable by said last-mentioned movable means to maintain said receptacles in a substantially vertical position while transferring from one vertical column to the other, means on each receptacle for engaging said guiding means of an adjacent receptacle, whereby lateral relative movement between successive receptacles and said means defining adjacent vertical columns is prevented.

19. In a conveyor comprising a plurality of load receptacles movable in a circuitous path successively through two adjacent interconnected straight portions thereof, means movable in correspondence with the movement of the load receptacles as they transfer from one straight portion to the other, guiding means on each receptacle, said guiding means being engageable by said last-mentioned movable means, whereby said receptacles are maintained in a substantially constant orientation while transferring from one straight portion to the other, a second guiding means on each receptacle, means on each receptacle for engaging said second guiding means on each receptacle, whereby relative movement between successive receptacles is prevented.

20. In an elevator system, means defining adjacent vertical columns, interconnected at their respective ends, a plurality of load receptacles in each of said columns, means for moving said load receptacles successively through the said columns in a definite path and with a continuous movement, means movable in correspondence with the movement of the receptacles as they transfer from one vertical column to the other, guiding means on each receptacle, said guiding means being engageable by said last-mentioned movable means, whereby said receptacles are maintained in a substantially vertical position while transferring from one vertical column to the other, a second guiding means on each receptacle, a means on each receptacle for engaging said second guiding means on an adjacent receptacle, whereby lateral relative movement between successive receptacles is prevented.

21. In an elevator system, means defining adjacent vertical columns, interconnected at their respective ends, a plurality of load receptacles in each of said columns, means for moving said load receptacles successively through said columns in a definite path and with a continuous movement, means movable in correspondence with the movement of the receptacles as they transfer from one vertical column to another and in a path corresponding to the path described by the said receptacles as they transfer from one vertical column to another, guiding means on each receptacle, said guiding means being engageable by said last-mentioned movable means, whereby said receptacles are maintained in a substantially vertical position while transferring from one vertical column to another, a second guiding means on each receptacle, a means on each receptacle for engaging said guiding means on an adjacent receptacle, whereby lateral relative movement between successive receptacles is prevented.

In testimony whereof, I have hereunto subscribed my name this 23rd day of May, 1929.

GILBERT CURRIE.